United States Patent
Choe et al.

(10) Patent No.: US 11,562,213 B2
(45) Date of Patent: Jan. 24, 2023

(54) METHODS AND ARRANGEMENTS TO MANAGE MEMORY IN CASCADED NEURAL NETWORKS

(71) Applicant: INTEL CORPORATION, Santa Clara, CA (US)

(72) Inventors: Byoungwon Choe, Seoul (KR); Kwangwoong Park, Seoul (KR); Seokyong Byun, Seoul (KR)

(73) Assignee: INTEL CORPORATION, Santa Clara, CA (US)

( * ) Notice: Subject to any disclaimer, the term of this patent is extended or adjusted under 35 U.S.C. 154(b) by 1192 days.

(21) Appl. No.: 15/954,767

(22) Filed: Apr. 17, 2018

(65) Prior Publication Data

US 2019/0042925 A1 Feb. 7, 2019

(51) Int. Cl.
G06N 3/063 (2006.01)
G06F 12/02 (2006.01)
G06N 3/04 (2006.01)

(52) U.S. Cl.
CPC .......... *G06N 3/063* (2013.01); *G06F 12/0284* (2013.01); *G06N 3/04* (2013.01); *G06N 3/0454* (2013.01)

(58) Field of Classification Search
CPC ........ G06N 3/063; G06N 3/0454; G06N 3/00; G06N 5/00; G06N 7/00; G06N 10/00; G06N 20/00; G06N 99/00
See application file for complete search history.

(56) References Cited

U.S. PATENT DOCUMENTS 10,019,668 B1 * 7/2018 Woo ..................... G06N 3/0427

OTHER PUBLICATIONS

Taro Sekiyama and Takashi Imamichi and Haruki Imai and Rudy Raymond (2018). Profile-guided memory optimization for deep neural networks. CoRR, abs/1804.10001. (Year: 2018).*
Nicolas Weber and Florian Schmidt and Mathias Niepert and Felipe Huici (2018). BrainSlug: Transparent Acceleration of Deep Learning Through Depth-First Parallelism. CoRR, abs/1804.08378. (Year: 2018).*

(Continued)

*Primary Examiner* — Kakali Chaki
*Assistant Examiner* — Johnathan R Germick
(74) *Attorney, Agent, or Firm* — KDB Firm PLLC

(57) ABSTRACT

Logic may reduce the size of runtime memory for deep neural network inference computations. Logic may determine, for two or more stages of a neural network, a count of shared block allocations, or shared memory block allocations, that concurrently exist during execution of the two or more stages. Logic may compare counts of the shared block allocations to determine a maximum count of the counts. Logic may reduce inference computation time for deep neural network inference computations. Logic may determine a size for each of the shared block allocations of the count of shared memory block allocations, to accommodate data to store in a shared memory during execution of the two or more stages of the cascaded neural network. Logic may determine a batch size per stage of the two or more stages of a cascaded neural network based on a lack interdependencies between input data.

25 Claims, 9 Drawing Sheets

(56) References Cited

OTHER PUBLICATIONS

Zhang, C., Li, P., Sun, G., Guan, Y., Xiao, B., & Cong, J. (2015). Optimizing FPGA-Based Accelerator Design for Deep Convolutional Neural Networks. In Proceedings of the 2015 ACM/SIGDA International Symposium on Field-Programmable Gate Arrays (pp. 161-170). Association for Computing Machinery. (Year: 2015).*

Y. Chen, J. Emer and V. Sze, "Eyeriss: A Spatial Architecture for Energy-Efficient Dataflow for Convolutional Neural Networks," 2016 ACM/IEEE 43rd Annual International Symposium on Computer Architecture (ISCA), 2016, pp. 367-379, doi: 10.1109/ISCA.2016.40. (Year: 2016).*

Y. Shen, M. Ferdman and P. Milder, "Maximizing CNN accelerator efficiency through resource partitioning," 2017 ACM/IEEE 44th Annual International Symposium on Computer Architecture (ISCA), 2017, pp. 535-547, doi: 10.1145/3079856.3080221. (Year: 2017).*

K. Zhang, Z. Zhang, Z. Li and Y. Qiao, "Joint Face Detection and Alignment Using Multitask Cascaded Convolutional Networks," in IEEE Signal Processing Letters, vol. 23, No. 10, pp. 1499-1503, Oct. 2016. doi: 10.1109/LSP.2016.2603342, 5 pages.

Wu, Dufan et al. "A Cascaded Convolutional Nerual Network for X-ray Low-dose CT Image Denoising." CoRR abs/1705.04267 (2017): n. pag.

Pang, Jiahao and Sun, Wenxiu and Ren, Jimmy SJ and Yang, Chengxi and Yan, Qiong, "Cascade Residual Learning: A Two-Stage Convolutional Neural Network for Stereo Matching", ICCV Workshop on Geometry Meets Deep Learning, Oct. 2017.

Ren, Haoyu & El-Khamy, Mostafa & Lee, Jungwon. (Nov. 2017). CT-SRCNN: "Cascade Trained and Trimmed Deep Convolutional Neural Networks for Image Super Resolution."

CCai, Zhaowei and Nuno Vasconcelos. "Cascade R-CNN: Delving into High Quality Object Detection." CoRR abs/1712.00726 (2017): n. pag.

A. Jourabloo and X. Liu, "Large-Pose Face Alignment via CNN-Based Dense 3D Model Fitting," 2016 IEEE Conference on Computer Vision and Pattern Recognition (CVPR), Las Vegas, NV, 2016, pp. 4188-4196. doi: 10.1109/CVPR.2016.454.

H. Li, Z. Lin, X. Shen, J. Brandt and G. Hua, "A convolutional neural network cascade for face detection," 2015 IEEE Conference on Computer Vision and Pattern Recognition (CVPR), Boston, MA, 2015, pp. 5325-5334. doi: 10.1109/CVPR.2015.7299170.

* cited by examiner

FIG. 1E

| | BATCH 16 (NAÏVE; DEFAULT CAFFE IMPLEMENTATION) | SHARED BLOCK REUSE ACROSS SUB-STAGES IN ROUND-ROBIN MEMORY ALLOCATOR | SHARED BLOCK REUSE ACROSS SUB-STAGES IN OUR MEMORY ALLOCATOR |
|---|---|---|---|
| RUNTIME MEMORY SIZE (MB) | 2,327.67 | 240.57 | 176.25 |

| | NO BATCH | STAGE 2/3 IN BATCH16 | STAGE 2/3 IN BATCH32 | STAGE 2/3 IN AUTOMATIC BATCH SIZE |
|---|---|---|---|---|
| INFERENCE SPEED (MS) | 136.59 | 120.19 | 103.81 | 97.42 |

← 1400

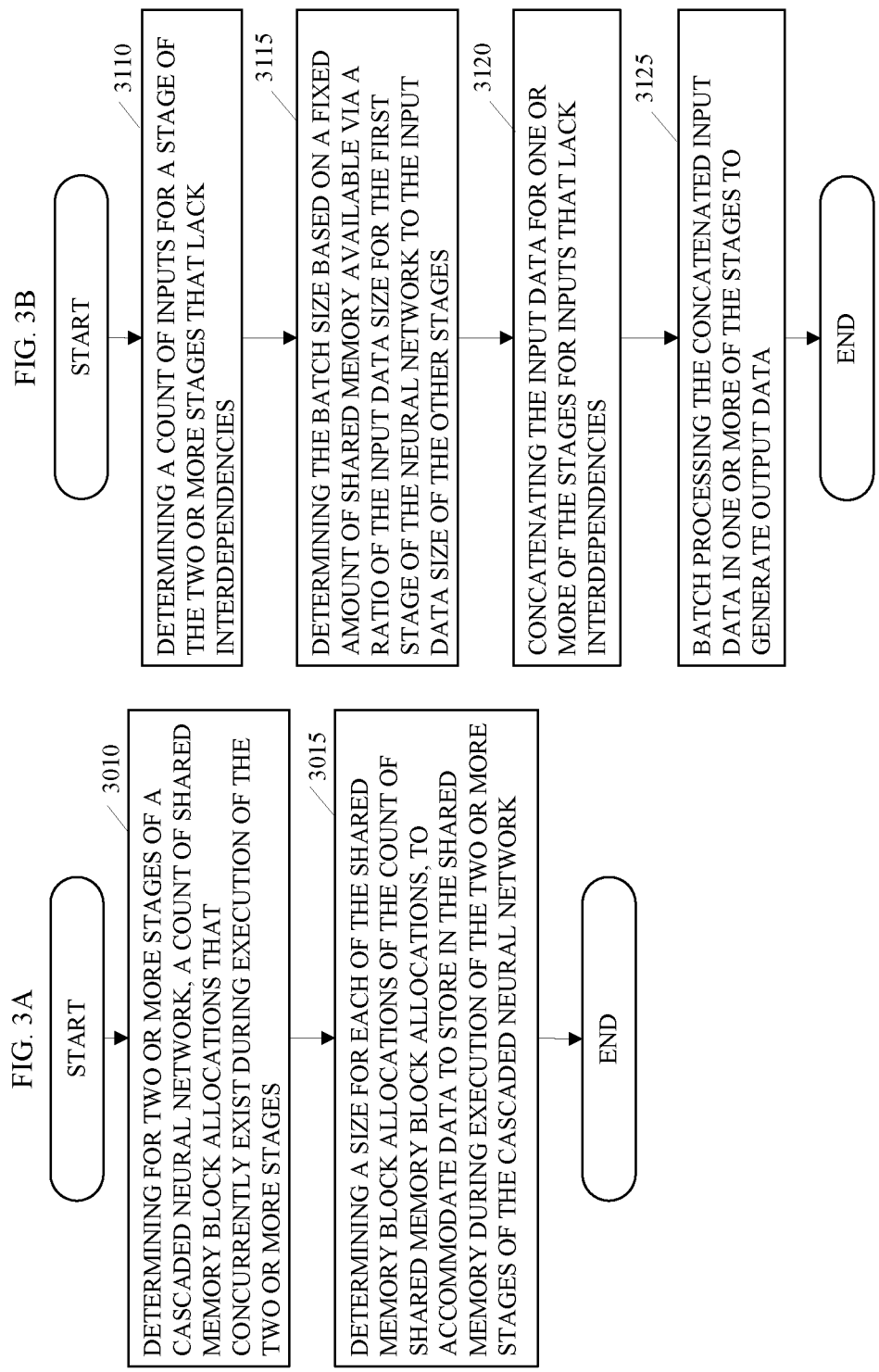

METHODS AND ARRANGEMENTS TO MANAGE MEMORY IN CASCADED NEURAL NETWORKS

TECHNICAL FIELD

Embodiments described herein are in the field of the memory management. More particularly, the embodiments relate to methods and arrangements to manage memory allocation in cascaded neural networks.

BACKGROUND

Driven by the availability of massive data and the computational capability to process the data, deep learning is as a critical tool for solving complex problems across a wide range of domains such as image recognition, speech processing, natural language processing, language translation, and autonomous vehicles. Convolutional neural networks (CNNs) have become the most popular algorithmic approach for deep learning for many of these domains. High performance and extreme energy efficiency are critical for deployments of CNNs in a wide range of situations, especially mobile platforms such as autonomous vehicles, cameras, and electronic personal assistants.

BRIEF DESCRIPTION OF THE DRAWINGS

FIG. 1E depicts an embodiment of a table to compare memory usage by other implementations versus memory usage by memory management logic circuitry, such as the memory management logic circuitry shown in FIGS. 1A and 1B;

FIG. 1F depicts an embodiment of a table to compare inference speeds by other implementations versus inference speed by memory management logic circuitry, such as the memory management logic circuitry shown in FIGS. 1A and 1B;

FIGS. 3A-C depict flowcharts of embodiments to optimize memory allocations and to implement batch processing by memory management logic circuitry, such as the memory management logic circuitry shown in FIGS. 1A and 1B.

DETAILED DESCRIPTION OF EMBODIMENTS

Figure 1B:
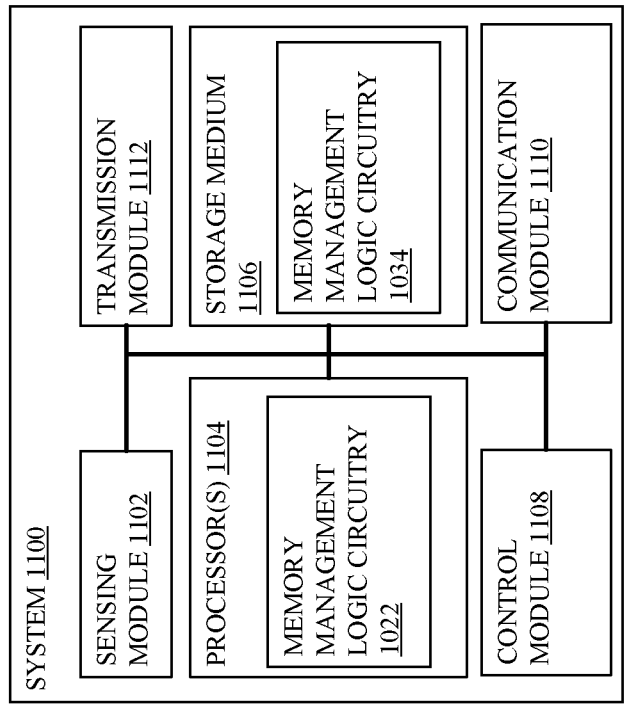
FIG. 1A-B depict embodiments of systems including processors, memory, a neural compute engine, and neural network pipelines.

The following is a detailed description of embodiments depicted in the drawings. The detailed description covers all modifications, equivalents, and alternatives falling within the appended claims.

Deep Neural Networks (DNN) became popular for handling many computer vision tasks but they are too heavy to run on embedded devices mainly because of limited memory resource as well as small compute power. Many DNNs comprise cascaded structure for face detection, object detection, or pose detection, where the subsequent network stage processes the output(s) produced from the previous network stage. Such cascaded networks, however, can require more runtime memory in inference and make it harder to deploy on embedded devices.

There are two main states for the neural networks including training and inference. During the training process, a deep learning expert will typically architect the network, establishing the number of layers in the neural network, the operation performed by each layer, and the connectivity between layers. Many layers have parameters, typically filter weights, that determine exact computation performed by the layer. The objective of the training process is to learn the filter weights, usually via a stochastic gradient descent-based excursion through the space of weights. Once the training process is complete, inference based on the trained neural network typically employs a forward-propagation calculation for input data to generate output data.

Input data may be in the form of tensor data. The tensor is a geometric object that describes linear relations between geometric vectors, scalars, and other tensors. An organized multidimensional array of numerical values, or tensor data, may represent a tensor. The order (also called the degree or rank) of a tensor is the dimensionality of the array, or equivalently, the number of indices that label a component of that array. For example, a linear map is represented by a matrix (a 2-dimensional array) in a basis, and therefore is a 2nd-order tensor. Tensors as inputs and outputs of layers may range from 1st order to 5th order or greater. In many applications, however, the tensors may be 2nd order or 3rd order.

Although there have been many attempts to deploy Deep Learning on small embedded devices with limited compute and memory resources, most of the previous methods focus in reducing compute resources during inference. Embodiments herein address memory management for inference computations to increase efficiencies in the use of memory resources, which can facilitate implementations on small embedded devices.

Several embodiments systematically analyze the cascaded deep neural networks to find a minimum memory size for running the Deep Learning inference. Moreover, many embodiments process each cascade stage of the neural network in batch to obtain the best speed with the minimum memory usage. As consequence, many embodiments offer ways to enable Deep Learning on embedded devices without requiring server-level memory resources.

To optimize memory usage, many embodiments take advantage of the flow of inference computations through a neural network. Unlike the training process, many inference computations are acyclic, meaning that the results typically feed subsequent computations rather than cycling back to prior calculations. Embodiments may treat each stage of a neural network for inference computations as a directed acyclic graph for analyses. Thus, a stage of the neural network receives inputs and produces outputs that affect subsequent layers in the neural network.

Many embodiments analyze each stage of the cascaded networks to find the optimal memory size from the biggest sub-network that requires the largest runtime memory. Several embodiments introduce an effective memory allocation optimizer instead of a simple round-robin method for allocating tensor data to sharable blocks. Some Deep Learning inference runtimes like Caffe may use shared blocks to minimize the number of memory allocations and deallocations.

Neural networks that process images for face detection and object detection typically cascade several stages of neural networks and perform several iterations of the same inference computation at each stage. Many embodiments take advantage of the multiple inference computations at each stage, the acyclic nature of the computations, and the optimized memory usage by batching the inference computations at one or more of the stages to the extent possible. In other words, prior embodiments serially perform inference computations at a stage for each input at that stage (e.g., each image). Many embodiments herein batch process the inputs, or process these inputs in parallel, within a fixed memory size to increase the speed of processing the input data.

Many embodiments analyze whether batching can apply in each stage of the cascade. Then, for each stage that is eligible for batch processing, many embodiments compute the maximum number for the batch size in the fixed shared block size. As the result, many embodiments reduce the computation time for inference computations by running several stages in the batch mode while also using the minimum memory size. Many embodiments run complicated deep neural network (DNN) cascades on embedded devices with limited compute power and memory.

Various embodiments may be designed to address different technical problems associated with memory allocations for inference computations for cascaded neural networks, such as in embedded devices with limited memory resources. Other technical problems may include reducing memory usage in shared memory during execution of cascaded neural networks for inference computations; serial inference computations at each stage in a cascaded neural network; limited memory and compute resources in an embedded device; determining a batch size for batching stages of inference computations; determining if input data can be batch processed for inference computations at each stage of a cascaded neural network; and/or the like.

Different technical problems such as those discussed above may be addressed by one or more different embodiments. For instance, some embodiments that address problems associated with memory allocations for inference computations for cascaded neural networks may do so by one or more different technical means, such as, determining for two or more stages of a cascaded neural network, a count of shared memory block allocations that concurrently exist during execution of the two or more stages; determining a size for each of the shared memory block allocations of the count of shared memory block allocations, to accommodate data to store in a shared memory during execution of the two or more stages of the cascaded neural network; generating a list of the shared memory block allocations that concurrently exist during execution of the two or more stages and size information for each of the shared memory block allocations; determining a batch size per stage of the two or more stages of a cascaded neural network; determining a count of inputs for a stage of the two or more stages that lack interdependencies; determining the batch size based on a fixed amount of shared memory available for execution of the two or more stages of the cascaded neural network; determining the batch size based on the maximum count, the size determined for each shared memory block allocations, and the count of inputs; determining a count of shared memory block allocations for tensor data to store in the shared memory and size information for the tensor data; calculating a batch size based on a ratio of an input data size of a first stage of the two or more stages to an input data size of another stage of the two or more stages; comparing counts of the shared memory block allocations that concurrently exist during execution of each of the two or more stages of the cascaded neural network to determine a maximum count of the counts of the shared memory block allocations; and the like.

Several embodiments comprise systems with multiple processor cores such as central servers, access points, and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, drones, and the like), and the like.

Figure 1A:
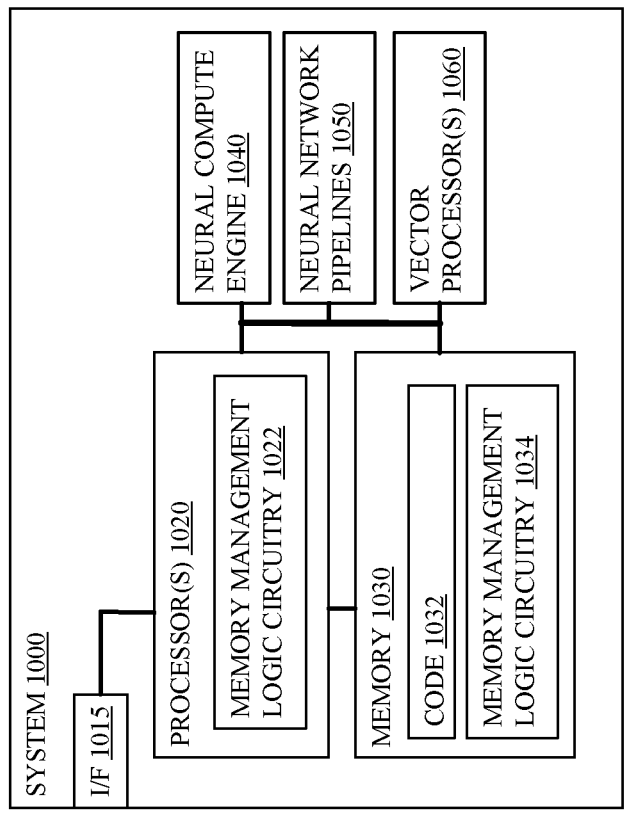

Turning now to the drawings, FIG. 1A illustrates an embodiment of a system 1000. The system 1000 may be an embedded system such as a deep learning accelerator card, a processor with deep learning acceleration, a neural compute stick, or the like. The system 1000 comprises an interface (I/F) 1015, processor(s) 1020, memory 1030, a neural compute engine 1040, neural network pipelines 1050, and vector processor(s) 1060. In some embodiments, the system 1000 comprises a System on a Chip (SoC) and, in other embodiments, the system 1000 includes a printed circuit board or a chip package with two or more discrete components.

The I/F 1015 may comprise a universal serial bus (USB) port, a Peripheral Component Interconnect enhanced (PCIe) bus interface, a point-to-point interface, a wireless communications interface, and/or the like. The I/F 1015 may couple with a host system to receive input data for a pre-trained neural network residing on the system 1000 in the memory 1030, processor(s) 1020 and/or vector processor(s) 1060. In further embodiments, the I/F 1015 may couple with the host system to receive a pre-trained neural network for execution on the system 1000.

The processor(s) 1020 may comprise the main processors for the system 1000 and may execute an operating system residing in the code 1032 in the memory 1030. The operating system may receive, store, and execute pre-trained deep neural networks (DNNs) via a hardware accelerator, the neural compute engine 1040, the neural network pipelines 1050, and the vector processor(s) 1060. For instance, the host system may train a DNN with cascaded stages for face detection and may transmit the DNN to the system 1000 for inference computations. Thereafter, the host system may provide input data to the DNN such as images as input data in the form of tensor data. The system 1000 may transmit the output of the DNN to the host system after completion of the inference computations on the images.

In the present embodiment, the processor(s) 1020 and the memory 1030 include memory management logic circuitry 1022 and 1034, respectively. The memory management logic circuitry 1022 may comprise processor circuitry of processor(s) 1020 that store and/or are executing middle ware code to manage memory usage of shared memory by a DNN during execution of the DNN.

The memory management logic circuitry 1022 and/or 1034 may comprise a memory allocation optimizer to optimize the usage of shared memory during execution of the stages of the DNN and may identify one or more opportunities with stages of the DNN to perform batch processing of input data for the one or more of the stages. The memory allocation optimizer may compute a required number of shared memory block allocations and each shared block allocation size for all the layers, or sub-stages, of a cascade DNN.

Figure 1C:
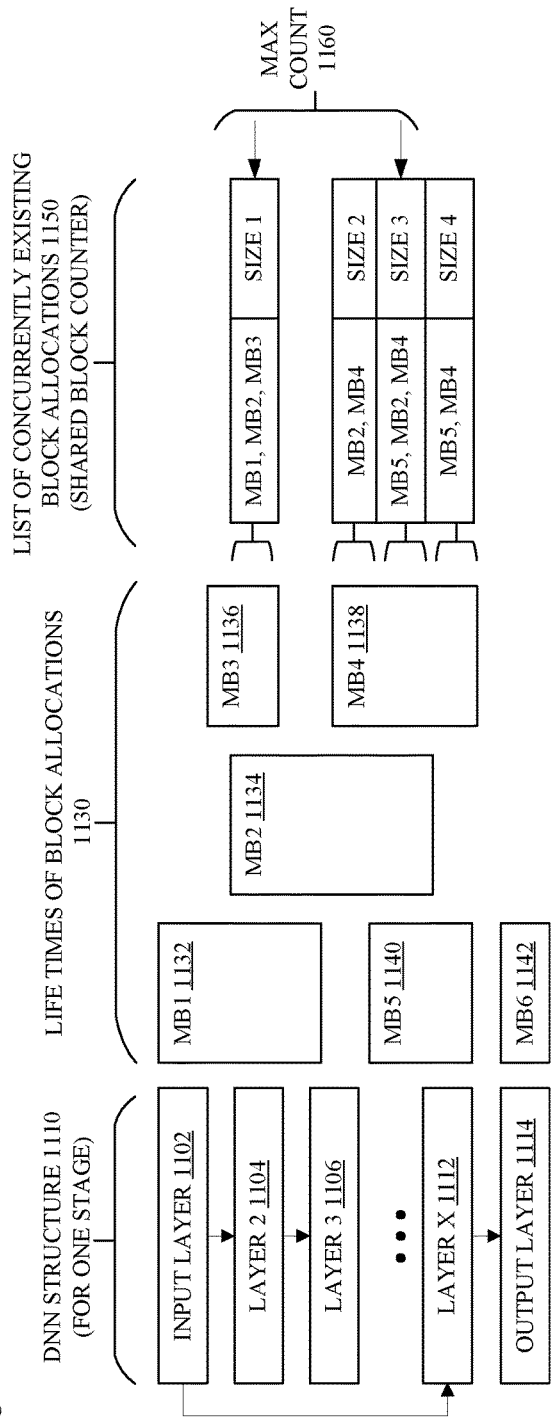
FIGS. 1C-D depicts embodiments of a process for memory management logic circuitry to optimize shared memory block allocations, such as the memory management logic circuitry illustrated in FIGS. 1A-B.

Referring now to FIGS. 1A and 1C, FIG. 1C depicts an embodiment of a process by memory management logic circuitry may optimize shared memory block allocations, such as the memory management logic circuitry illustrated in FIGS. 1A-B. FIG. 1C illustrates a DNN structure 1110 for one stage of the DNN, life times of shared memory block allocations 1130, and a list of concurrently existing block allocations 1150. In some embodiments, the DNN structure 1110 may comprise a series of one or more pairs of convolution and convolution rectifier or rectified linear unit (ReLU) layers.

The DNN structure 1110 shows layers of one stage of the DNN structure that receives one or more inputs from a previous layer but does not include cyclic inputs. The memory management logic circuitry 1022 and/or 1034 may search the DNN structure 1110 to identify or determine each memory block allocation and the life times of the block allocations 1130. For instance, a first block allocation (MB1) 1132 begins at the input layer 1102 and the life time spans to layer 3 1106. A second block allocation (MB2) 1134 begins and at input layer 2 1104 and spans to layer X 1112. A third block allocation (MB3) 1136 begins at layer 2 1104 and the life time spans to the end of layer 2 1106. A fourth block allocation (MB4) 1138 begins at layer 3 1106 and the life time spans to the end of layer X 1112. A fifth block allocation (MB5) 1140 begins after layer 3 1106 and before layer X 1112 and the life time spans to the end of layer X 1112. Then the sixth block allocation (MB6) 1142 begins at the output layer 1114 and the life time spans to the end of the output layer 1114.

A shared block counter of the memory management logic circuitry 1022 may generate a list based on the search of the DNN structure 1110 like a directed acyclic graph (DAG) to count the number of shared memory block allocations during each of the layers to determine a count of concurrently existing, shared memory block allocations. In many embodiments, the shared block counter may include size information such as sizes 1 through 4 in the list of concurrently existing block allocations 1150. For example, at layer 1 1102, the block allocation (MB1) does not concurrently exist with other block allocations so the shared block counter does not add an entry in the list of concurrently existing block allocations 1150. However, concurrently existing block allocations occur at layer 3 1104 (MB1, MB2, MB3), at layer 3 1106 (MB2,MB4), between layer 3 1106 and layer X 1112 (MB5,MB2,MB4), and at layer X 1112 (MB5,MB4).

Based on the list of concurrently existing block allocations 1150, a maximum block allocation counter of the memory management logic circuitry 1022 may determine that the maximum count 1160 of block allocations is three as evidenced by the concurrent existence of block allocations MB1,MB2,MB3 and MB5,MB2,MB4 during inference computations. In other words, the stage of the DNN 1110 requires at most three memory block allocations at one time.

Figure 1D:
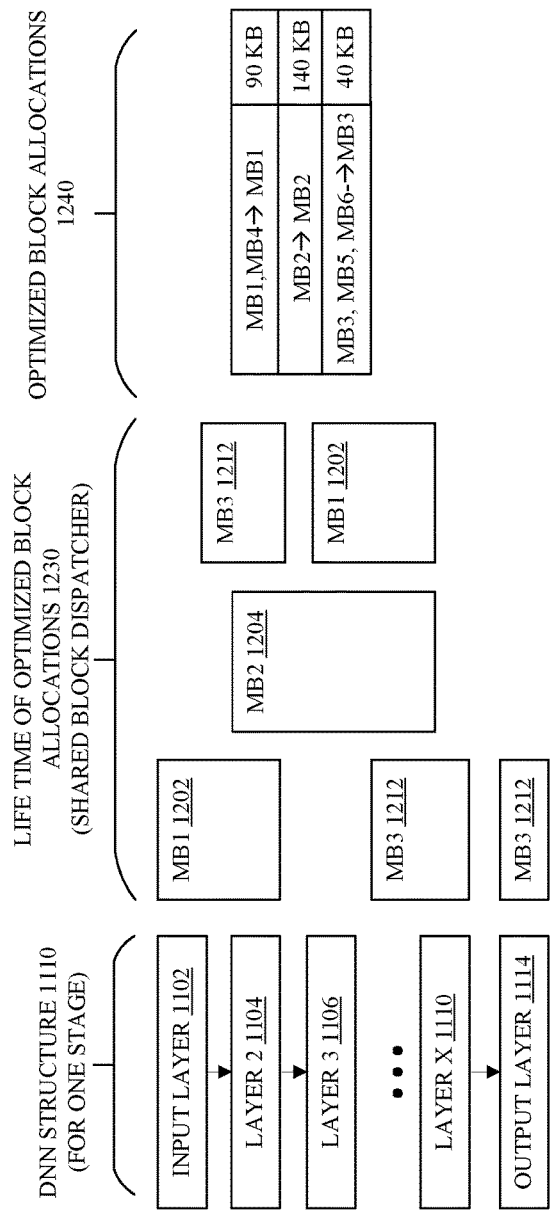

Referring now to FIGS. 1A and 1D, FIG. 1D depicts an embodiment of a process for memory management logic circuitry to optimize shared memory block allocations, such as the memory management logic circuitry illustrated in FIGS. 1A-B. After determining the maximum number of block allocations that concurrently exist in the stage of the DNN structure 1110 shown in FIG. 1C, the memory management logic circuitry 1022 may perform the same process with each of the remaining stages in the DNN and then determine a maximum count for all the stages. Assuming that the memory management logic circuitry 1022 determines that the three block allocations of shared memory is the maximum count for all stages, the memory management logic circuitry 1022 may proceed to determine an optimal size for each of the shared memory block allocations.

The memory management logic circuitry 1022 may then determine the optimal size for each of the shared memory block allocations based on the maximum count, which may be the life cycle of the tensors, and the expected total shared block size of the shared memory block allocations. For instance, if there are a maximum of three alive tensors in the network for the network life cycles then the required number of shared blocks are three without considering expected total block size. However, if we consider the expected total block size also then the optimal shared block sizes may be greater than the size of the three tensors. Therefore, a shared memory block dispatcher of the memory management logic circuitry 1022 may calculate the optimal number of shared memory block allocations considering with the maximum number of alive tensors and expected total block size.

To illustrate, the memory management logic circuitry 1022 may search the DNN structure 1110 for all stages of the DNN similar to the process shown for one stage of the DNN structure 1110 in FIG. 1D. FIG. 1D illustrates the same layers of the one stage of the DNN structure 1110 illustrated in FIG. 1C, the life time of optimized block allocations 1230, and a list of the optimized block allocations 1240. Based on the determination that the maximum count of concurrently existing block allocations is three for all the stages of the DNN, the memory management logic circuitry 1022 may determine, based on the DNN structure 1110, to optimize the block allocations MB1, MB2, and MB3. If this is the first stage, the memory management logic circuitry 1022 may set the sizes for the block allocations MB1, MB2, and MB3 to zero, allocate a block allocation MB1 1202 to the input layer 1102, and allocate a block allocation MB3 1212 to the output layer 1114. Thereafter, the memory management logic circuitry 1022 may identify each subsequent allocation after the input layer 1102, assign the smallest available block allocation of MB1, MB2, and MB3 that is available and accommodates the size of the subsequent allocation, and adjust the sizes of the block allocations MB1, MB2, and MB3, as necessary, to accommodate the data that the DNN layers store in the block allocations. Furthermore, if none of the shared memory block allocations MB1, MB2, and MB3 are available and large enough to accommodate a subsequent allocation, the memory management logic circuitry 1022 may select the smallest available memory block allocation of MB1, MB2, and MB3 and increase the size to accommodate the subsequent allocation.

For example, assume that the memory management logic circuitry 1022 sets MB1 1202 to 90 kilobytes (KB) to accommodate input tensor data in the input layer 1102. Assume that the memory management logic circuitry 1022 sets MB3 1212 to 40 KB to accommodate the output layer 1114 output tensor data and assume that MB2 has yet to be allocated so MB2 is at the reset value of zero KB. The memory management logic circuitry 1022 may progress from the input layer 1102 to layer 2 1104 to determine that the output of the input layer has a subsequent allocation of 30 KB. The smallest available shared block allocation that accommodates 30 KB is MB3 so the memory management logic circuitry 1022 may assign the 30 KB to MB3 1212.

The memory management logic circuitry 1022 may progress from the input layer 1102 to layer 2 1104 to determine that inference computation at layer 2 has a subsequent allocation of 140 KB. At layer 2, MB1 1202 remains allocated and MB3 remains allocated. Since the smallest block allocation that is available is MB2, the memory management logic circuitry 1022 may select MB2 for the allocation from layer 2 1104 and increase the size of MB2 to 140 KB.

After layer 2 1104, inference computation at the layer 3 1106 may present the next subsequent allocation of 60 KB. At layer 3 1106, MB1 is not allocated, MB2 remains allocated, and MB3 is too small to accommodate 60 KB. MB1 is a 90 KB allocation so the memory management logic circuitry 1022 may assign the subsequent allocation of 60 KB to MB1 1208.

Between layer 3 1106 and layer X 1110, the memory management logic circuitry 1022 may identify a subsequent allocation of 40 KB. MB1 remains allocated, MB2 remains allocated, and MB3 can accommodate 60 KB. Thus, the memory management logic circuitry 1022 may select MB3 1212 for the subsequent allocation of 40 KB. Furthermore, at the output layer 1114, the shared memory block allocations MB1, MB2, and MB3 are not allocated and the output layer 1114 has a subsequent allocation of 40 KB, which was allocated to MB3 1212 at the beginning of the process of sizing the shared memory block allocations for this stage.

Once the memory management logic circuitry 1022 completes the process of sizing the shared memory block allocations for this stage, the memory management logic circuitry 1022 may complete the process with the same memory block allocations for the remaining stages until the memory management logic circuitry 1022 assigns each allocation by the layers of the stages to one of the three shared memory block allocations determined to be the maximum count of concurrently existing block allocations as discussed in conjunction with FIG. 1C.

Assuming that the memory management logic circuitry 1022 completes allocations for all the stages of the DNN, and the other stages did not increase the allocations from the stage shown in FIG. 1D, the optimized block allocations 1240 are MB1 set at 90 KB, MB2 set at 140 KB, and MB3 set at 40 KB, per the discussions with respect to FIG. 1D. Note that the optimized block allocations also relate the original allocations from FIG. 1C with the new allocations in FIG. FIG. 1D that maximize reuse of the same block allocations and increase the potential for batch processing.

Figure 1G:
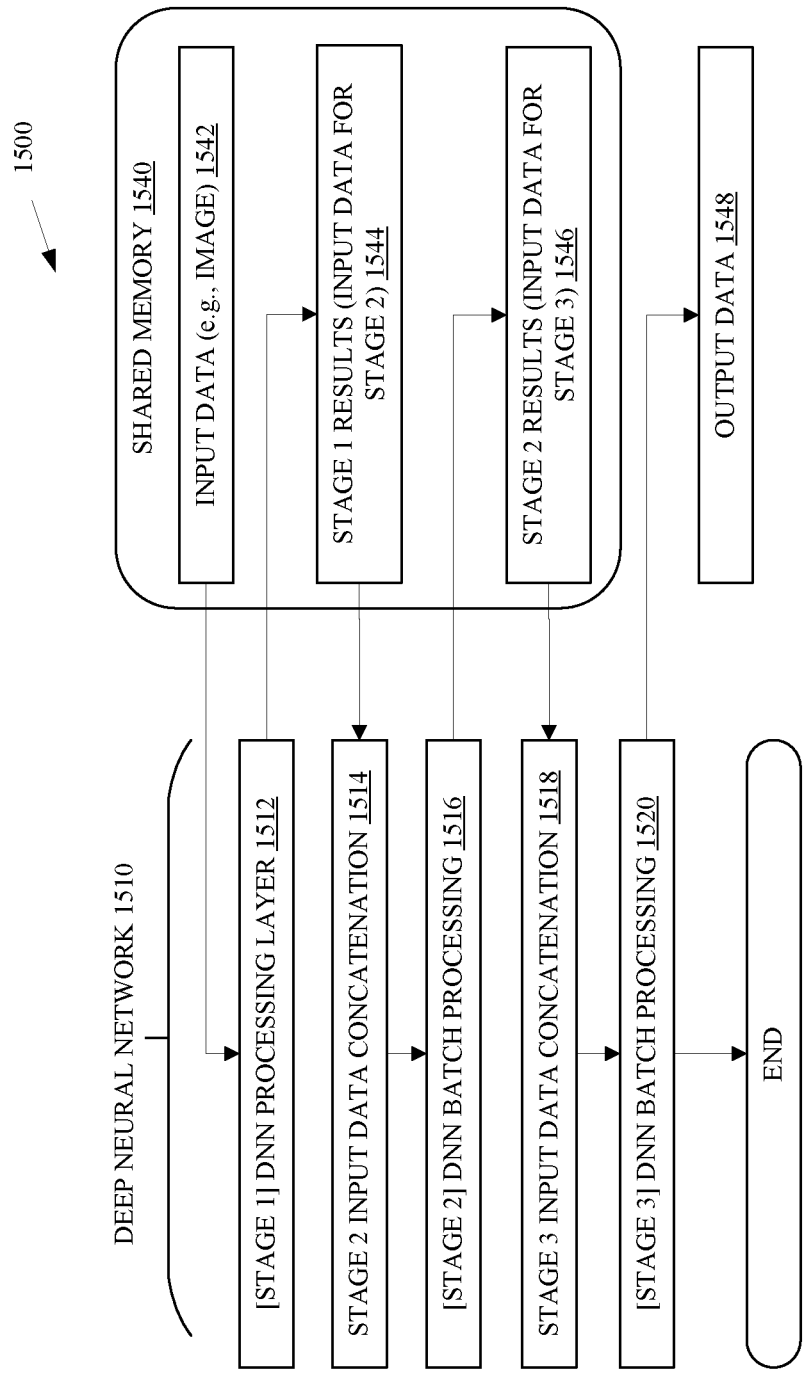
FIG. 1G depicts an embodiment of stages of a deep neural network and shared memory to illustrate a process of batch processing by memory management logic circuitry, such as the memory management logic circuitry shown in FIGS. 1A and 1B.

Referring now to FIGS. 1A and 1G, FIG. 1G depicts an embodiment 1500 of stages of a deep neural network (DNN) 1510 and shared memory 1540 to illustrate a process of batch processing by memory management logic circuitry, such as the memory management logic circuitry 1022 and 1032 shown in FIGS. 1A and 1B. In several embodiments, each stage of the DNN 1510 may comprise a convolutional neural network (CNN) to form a cascaded deep neural network and the input may comprise a single image. In some embodiments, the memory management logic circuitry 1022 may determine the applicability of batch processing after performing the memory allocation optimization in FIGS. 1C and 1D. In further embodiments, these processes can occur concurrently.

In a typical cascade DNN, a first stage network takes single full-size input image and the subsequent networks receive as input data, multiple small-sized output images or features of previous stage network. As a result of the shrinking input data or tensor data sizes, batch processing becomes an important candidate to improve end-to-end performance. In many embodiments, the memory management logic circuitry 1022 may implement the batch processing while maintaining the total memory requirement within the size of memory for the first stage of inference computations in the DNN 1510.

To implement the batch processing, the memory management logic circuitry 1022 may check the prerequisite condition for the batch processing, calculate the maximum possible batch number or batch size, and set batch processing with the selected number. The memory management logic circuitry 1022 may check the input data for each stage of the DNN 1510 for interdependencies. For instance, if calculations during a stage on a first input data determines or affects the calculations during the same stage on the second input data, the second input data is dependent on the first input data, a temporal dependency, and thus cannot be batch processed with the first input data. However, if the first input data and the third input data do not have any interdependencies, the first input data and the third input data are candidates for batch processing.

After determining which input data for a stage of the DNN 1510 is eligible for batch processing, the memory management logic circuitry 1022 may calculate the batch number, or batch size, based on the ratio of stage 1's input data size (the size of the input data 1542) to other stages' input data sizes. In other words, the memory management logic circuitry 1022 may, in some embodiments, automatically determine a batch size for executing the batch processing that does not require more memory than performance of the stage 1 inference computations. This is done by determining the ratio of input data 1542 of the stage 1 to the input data of stage 2 (stage 1 results 1544) and to the input data of stage 3 (stage 2 results 1546). For example, the embodiment 1500 shows input data 1542 as an input to [Stage 1] DNN processing layer 1512. The DNN 1510 stores the output of stage 1 in the shared memory 1540 as stage 1 results 1544, which is also input data for stage 2 of the DNN 1510. The [Stage 2] input data concatenation layer 1516 may concatenate the input data such as input tensor data that may be in the form of a 2nd order tensor or a 3rd order tensor so that the [Stage 2] DNN batch processing 1516 can process multiple input data or tensor data simultaneously. If, for instance, the ratio of the input data 1542 for the first stage to the input data 1544 for the second stage is 10:1, meaning that the tensor data for the inputs of stage 1 are 10 times larger than the tensor data input into stage 2, then the [Stage 2] input data concatenation can concatenate 10 tensor data inputs for batch processing by the [Stage 2] DNN batch processing layer 1516, advantageously without increasing the amount of shared memory required to perform the inference computations.

Similarly, the stage 2 results 1546 for the input data for stage 3 and the Stage 3 input data concatenation layer 1518 can automatically concatenate the input data (that passes the interdependency check) based on the ratio of the input data 1546 size for stage 3 to the input data 1542 size in stage 1. The [Stage 3] DNN batch processing layer 1520 may perform processing of the concatenated tensor data simultaneously to produce the output data 1548.

In other embodiments, the memory management logic circuitry 1022 may perform batch sizing based on a fixed amount of memory such as the amount of shared memory available for executing the DNN 1510 rather than based on the amount of memory used during stage 1 DNN inference computations. For example, the memory management logic circuitry 1022 may determine the ratio of the fixed amount of memory to the memory usage in stage 1 for one input data to determine a batch size for stage 1 inference computations. Thereafter, the ratio of input data for stage 1 to the input data for the other stage, such as stage 2, is multiplied by the ratio of the fixed amount of memory to the memory usage in stage 1 to determine automatic batch sizes for the other stages.

FIG. 1E depicts an embodiment of a table 1300 to compare memory usage by other implementations versus memory usage by memory management logic circuitry, such as the memory management logic circuitry shown in FIGS. 1A and 1B. Table 1300 shows the experimental results from application of an embodiment in DNN cascade for face detection. Table 1300 shows a comparison of memory size from the default Caffe implementation to significantly optimized memory size of our embodiment from a cascaded face detection network. As shown in the table 1300, the default Caffe implementation allocates over 2 gigabytes of memory to the DNN for face detection. The shared block reuse across sub-stages in a round-robin memory allocation scheme uses 240 MB. And an embodiment described herein uses 176.25 MB, which demonstrates a significant improvement over these other current methods of memory allocation for inference computation. The experimental results from a production DNN solution clearly demonstrates significant memory reduction and performance improvement.

FIG. 1F depicts an embodiment of a table 1400 to compare inference speeds by other implementations versus inference speed by memory management logic circuitry, such as the memory management logic circuitry shown in FIGS. 1A and 1B. Table 1400 shows the experimental results from application of an embodiment in DNN cascade for face detection. Table 1400 shows a comparison of Deep Learning inference performance in processing cascaded face detection with no batch processing (136.59 ms), batch processing for stages 2 and 3 in batch 16 (120.19 ms), batch processing for stages 2 and 3 in batch 32 (103.81 ms), and batch processing for stages 2 and 3 with automatic batch size (97.42 ms). Automatic batch sizing significantly improves the performance from the default non-batch mode. The experimental results from a production DNN solution of an embodiment clearly demonstrate significant memory reduction and performance improvement.

FIG. 1B depicts an alternative embodiment for a system 1100. The system 1100 may control a movable object, in accordance with embodiments. The system 1100 can combine with any suitable embodiment of the systems, devices, and methods disclosed herein. The system 1100 can include a sensing module 1102, processor(s) 1104, a non-transitory storage medium 1106, a control module 1108, and communication module 1110. Each of these modules include circuitry to implement logic such as code and can also be referred to as logic circuitry.

The sensing module 1102 may use several types of sensors that collect information relating to the movable objects in several ways. Distinct types of sensors may sense several types of signals or signals from different sources. For example, the sensors can include inertial sensors, GPS sensors, proximity sensors (e.g., lidar), or vision/image sensors (e.g., a camera). The sensing module 1102 can operatively couple to a processor(s) 1104. In some embodiments, the sensing module 1102 can operatively couple to a transmission module 1112 (e.g., a Wi-Fi image transmission module) to directly transmit sensing data to a suitable external device or system. For example, the transmission module 1112 can transmit images captured by a camera of the sensing module 1102 to a remote terminal.

The processor(s) 1104 may comprise one or more processors, such as a programmable processor (e.g., a central processing unit (CPU)). The processor(s) 1104 may comprise processor circuitry to implement memory management logic circuitry 1022 such as the memory management logic circuitry 1022 in FIG. 1A.

The processor(s) 1104 may operatively couple with a non-transitory storage medium 1106. The non-transitory storage medium 1106 may store logic, code, and/or program instructions executable by the processor(s) 1104 for performing one or more instructions including the memory management logic circuitry 1034 such as the memory management logic circuitry 1034 in FIG. 1A. The non-transitory storage medium may comprise one or more memory units (e.g., removable media or external storage such as a secure digital (SD) card or random-access memory (RAM)). In some embodiments, data from the sensing module 1102 transfers directly to and stores within the memory units of the non-transitory storage medium 1106. The memory units of the non-transitory storage medium 1106 can store logic, code and/or program instructions executable by the processor(s) 1104 to perform any suitable embodiment of the methods described herein. For example, the processor(s) 1104 may execute instructions causing one or more processors of the processor(s) 1104 to analyze sensing data produced by the sensing module. The memory units may store sensing data from the sensing module 1102 for processing by the processor(s) 1104. In some embodiments, the memory units of the non-transitory storage medium 1106 may store the processing results produced by the processor(s) 1104.

In some embodiments, the processor(s) 1104 may operatively couple to a control module 1108 to control a state of the movable object. For example, the control module 1108 may control the propulsion mechanisms of the movable object to adjust the spatial disposition, velocity, and/or acceleration of the movable object with respect to six degrees of freedom. Alternatively, or in combination, the control module 1108 may control one or more of a state of a carrier, payload, or sensing module.

The processor(s) 1104 may couple to a communication module 1110 to transmit and/or receive data from one or more external devices (e.g., a terminal, display device, or other remote controller). For example, the communication module 1110 may implement one or more of local area networks (LAN), wide area networks (WAN), infrared, radio, Wi-Fi, point-to-point (P2P) networks, telecommunication networks, cloud communication, and the like. In some embodiments, communications may or may not require line-of-sight. The communication module 1110 can transmit and/or receive one or more of sensing data from the sensing module 1102, processing results from the processor(s) 1104, predetermined control data, user commands from a terminal or remote controller, and the like.

The components of the system 1100 can be arranged in any suitable configuration. For example, one or more of the components of the system 1100 can be located on the movable object, carrier, payload, terminal, sensing system, or an additional external device in communication with one or more of the above.

Figure 2:
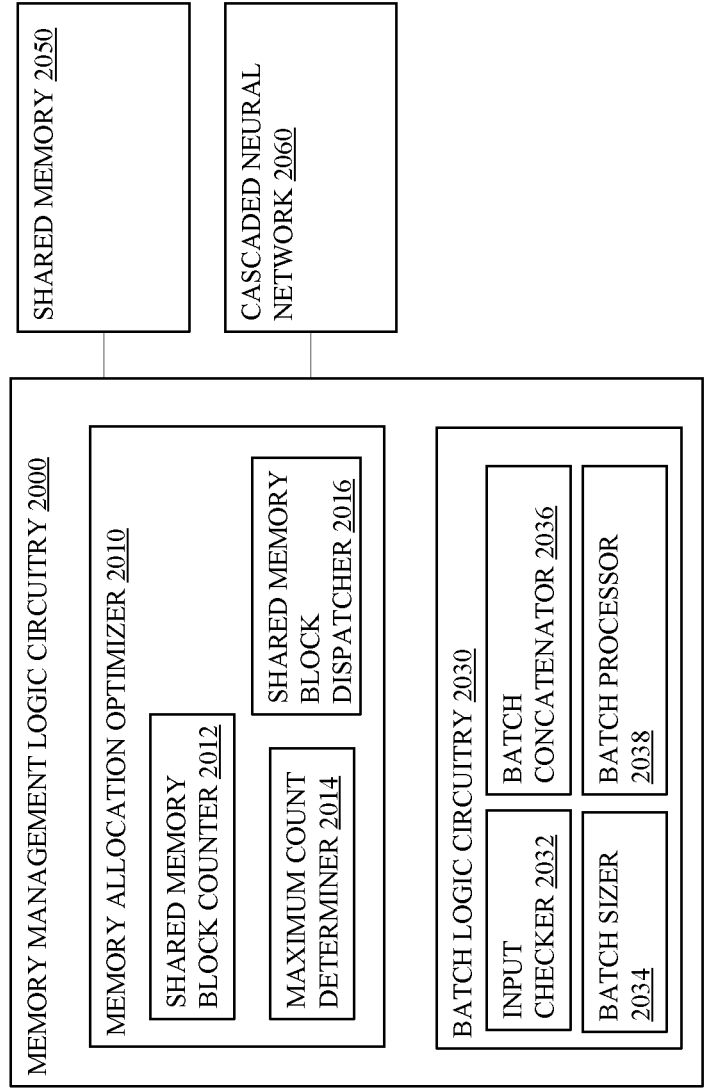
FIG. 2 depicts an embodiment of memory management logic circuitry, such as the memory management logic circuitry shown in FIGS. 1A and 1B.

FIG. 2 depicts an embodiment of a memory management logic circuitry 2000 such as the memory management logic circuitry 1022 and/or 1034 in FIG. 1A. The memory management logic circuitry 2000 may perform one or more operations to manage memory block allocations in a shared memory 2050 such as cache or other memory during inference computations in a cascaded neural network 2060. The memory management logic circuitry 2000 may comprise a memory allocation optimizer 2010 and a batch logic circuitry 2030.

The memory allocation optimizer 2010 may search the directed acyclic graph (DAG) of the cascaded neural network 2060. The DAG is the order of computations through the layers of each stage of the cascaded neural network 2060 for inference computations. The memory allocation optimizer 2010 may comprise a shared memory block counter 2012, a maximum count determiner 2014 and a shared memory block dispatcher 2016.

The shared memory block counter 2012 may determine counts of concurrently existing shared memory block allocations during the execution of each of the stages of the cascaded neural network 2060 and generate a list of these concurrently existing shared memory block allocations along with size information related to the sizes of the tensors in each of the shared memory block allocations.

After the shared memory block counter 2012 determines the count of shared memory block allocations, the maximum count determiner 2014 may determine the maximum number of shared memory block allocations concurrently existing throughout all the stages of the cascaded neural network 2060. With the maximum count of shared memory block allocations concurrently existing, the shared memory block dispatcher 2016 may determine a size for each of the maximum count of shared memory block allocations. Beginning, initially, by setting the sizes of each of the maximum count of shared memory block allocations to zero, or another small size, the shared memory block dispatcher 2016 may progress through shared memory block allocations in each of the layers of each of the stages of the cascaded neural network 2060 to determine how each block allocation of the maximum count can be allocated to maximize reuse in the inference computations throughout cascaded neural network 2060. For example, the shared memory block dispatcher 2016 may determine the input data and output data of each layer in each stage of the cascaded neural network 2060 and assign the smallest shared memory block allocations that accommodate the input data and output data. Thereafter, the shared memory block dispatcher 2016 may select the smallest available block allocation for each allocation requirement in a layer. If none of the available block allocations accommodate a requirement of the layer, the shared memory block dispatcher 2016 may select the smallest block allocation of the available block allocations and increase the size of that block allocation to accommodate the requirement of the layer.

The shared memory block dispatcher 2016 may repeat this process for each layer in each stage of the cascaded neural network 2060 until the combination of the maximum count of shared memory block allocations can accommodate all data stored in the shared memory 2050 throughout the inference computations of the cascaded neural network 2060.

The batch logic circuitry 2030 may, in some embodiments, automatically determine if batch processing of the input data is possible for each stage of the cascaded neural network 2060. Thereafter, the batch logic circuitry 2030 may batch process multiple input data, such as tensor data, at the same time, advantageously increasing the speed of inference computations for the cascaded neural network 2060. The batch logic circuitry 2030 may comprise an input checker 2032, a batch sizer 2034, a batch concatenator 2036, and a batch processor 2038. The input checker 2032 may determine if batch processing is possible and the extent to which batch processing is possible. In particular, the batch logic circuitry 2030 may process several instances of input data in parallel so long as the processing of one instance does not depend on the processing of another instance of the input data in the same stage. Thus, the input checker 2032 may check the inference computations of the pre-trained stages in the cascaded neural network 2060 to determine if any interdependencies exist between the input data for each of the stages. If no interdependencies exist, then the cascaded neural network can batch process all the input data up to the maximum batch size, which may impose a maximum memory size for the inference computations. If some of the input data is dependent on processing of other input data, the batch logic circuitry 2030 may implement a series of batches for processing to account for interdependencies between instances of the input data.

The batch sizer 2034 may determine the maximum batch size based on available shared memory 2050 for the inference computations. In some embodiments, the maximum batch size is based on the ratio of the input data for the first stage and the input data for the subsequent stages. For instance, if the input data for the first stage is five times larger than the input data for the second stage, the maximum batch size for the second stage can be five. In other words, the batch concatenator 2036 can concatenate five inputs for the second stage of the cascaded neural network 2060 without increasing the shared memory requirements for inference computations between the first stage and the second stage. Similarly, the batch sizer 2034 can determine that the ratio of the input data of the first stage to the third stage is 15:1 so the batch concatenator 2036 can concatenate fifteen inputs for the third stage of the cascaded neural network 2060 without increasing the shared memory requirements for inference computations between the first stage and the third stage.

The batch concatenator 2036 may combine instances of input data for a stage to present to the cascaded neural network as a single input to batch process the inputs. The batch processor 2038 may present the concatenated input data for each applicable stage of the neural network 2060 as input data to perform the batch processing.

Figure 3C:
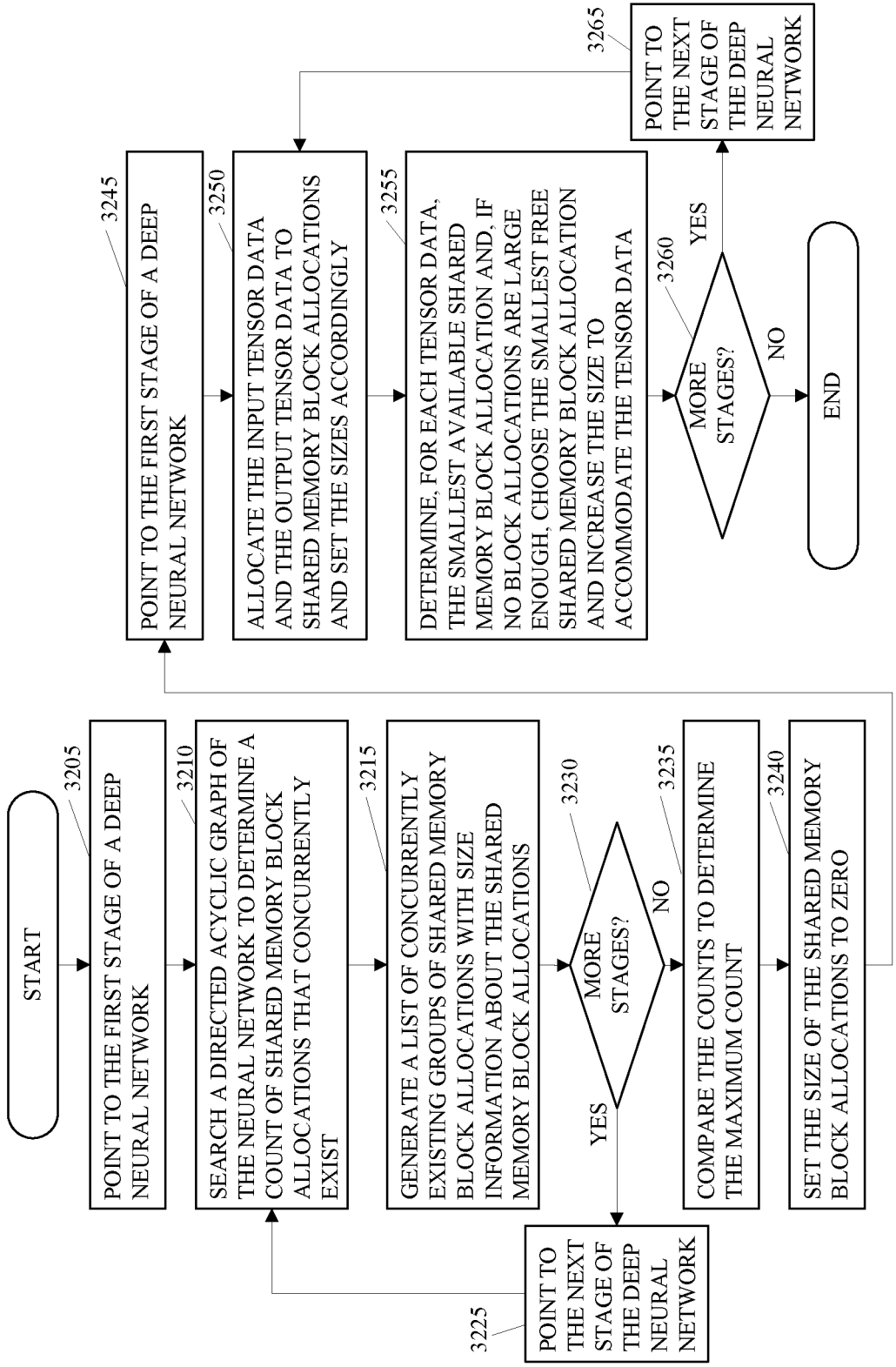

FIGS. 3A-C depict flowcharts of embodiments to optimize memory allocations and to implement batch processing by memory management logic circuitry, such as the memory management logic circuitry shown in FIGS. 1A and 1B. FIG. 3A illustrates a flowchart to determine optimized shared memory block allocations for a pre-trained neural network. The flowchart starts with determining for two or more stages of a cascaded neural network, a count of shared memory block allocations that concurrently exist during execution of the two or more stages (element 3010). In many embodiments, the memory management logic circuitry, such as the memory management logic circuitry 1022 and/or 1034 in FIGS. 1A-B and the memory management logic circuitry 2000 in FIG. 2, may search the DNN structure of a cascaded neural network to identify shared memory requirements or allocations. The memory management logic circuitry may further identify shared memory block allocations that arise during the life time of one or more other shared memory block allocations to determine a count of shared memory block allocations that exist at the same instances in time during the execution of inference computations. A maximum count of these counts of the shared memory block allocations will inform the memory management logic circuitry of the minimum number of shared memory block allocations that the pre-trained, cascaded neural network will require during inference computations for all the stages of the cascaded neural network.

After determining the maximum count of the shared memory block allocations, the memory management logic circuitry may determine a size for each of the shared memory block allocations of the count of shared memory block allocations, to accommodate data to store in the shared memory during execution of the two or more stages of the cascaded neural network (element 3015). In several embodiments, the memory management logic circuitry may determine the size of the shared memory block allocations by stepping through the inference computations layer by layer and stage by stage through the neural network, determining the size of each of the shared memory block allocations until each allocation of the maximum count has a size and at least one allocation of the maximum count will be available with the appropriate size for each instance of data that the inference computations store in the shared memory during the execution of the neural network on the input data.

FIG. 3B illustrates a flowchart for batch processing input data. The flowchart begins with determining a count of inputs for a stage of the two or more stages that lack interdependencies (element 3110). A memory management logic circuitry, such as the memory management logic circuitry 2000 in FIG. 2 may check the multiple instances of input data at the input of each stage or at least each stage after the first stage and determine if the instances of input data can process in a batch. In other words, the memory management logic circuitry may, by searching the DNN structure of a neural network, determine if inference computation based on an input at a particular stage is dependent on any computations of any other instance of input data in the same stage. If the instances of input data have interdependencies, the order in which the instances of input data batch process or otherwise process may proceed in accordance with the dependencies. In some embodiments, the memory management logic circuitry may address such interdependencies by preparing more than one batches of input data in an order based on the interdependencies. If there are no interdependencies, then the maximum batch size of input data can process in parallel through the stage.

After checking the interdependencies of the input data, the memory management logic circuitry may determine the batch size based on a fixed amount of shared memory available via a ratio of the input data size for the first stage of the neural network to the input data size of the other stages (element 3115). In many embodiments, the memory management logic circuitry may perform automatic batch processing for eligible input data for stages after stage one. The automatic batch processing can increase the performance of the cascaded neural network significantly for inference computations without increasing the shared memory requirements above the memory requirements for the first stage of the cascaded neural network.

With input data eligible for batch processing and a known batch size for at least the stages after the first stage, the memory management logic circuitry may concatenate the eligible input data at each stage (element 3120) and batch process the concatenated input data in one or more of the stages of the cascaded neural network (element 3125).

FIG. 3C illustrates a flowchart for determining shared memory block allocations with memory management logic circuitry such as the memory management logic circuitry 2000 illustrated in FIG. 2 and the memory management logic circuitry 1022 and 1034 in FIGS. 1A-B. The flowchart begins with pointing to the first stage of a deep neural network (element 3205). Beginning with the first stage, the memory management logic circuitry may search a directed acyclic graph of the neural network to determine a count of shared memory block allocations that concurrently exist for inference computations (element 3210) and generate a list of concurrently existing groups of shared memory block allocations with size information about the shared memory block allocations (element 3215). In other words, the memory management logic circuitry may determine the overlapping life times of the shared memory block allocations and determine a count of the number of the shared memory block allocations that overlap during inference computations to determine how many shared memory block allocations that performance of the inference computations require.

After determining the count of concurrently existing shared memory block allocations in the first stage, the memory management logic circuitry may determine if there are additional stages (element 3230). Since this is a deep neural network, there is at least a second stage so the memory management logic circuitry may point to the next stage of the deep neural network (element 3225) and repeat the process from element 3210 to determine counts of the overlapping life times of the shared memory block allocations in each of the stages of the deep neural network.

Once the memory management logic circuitry performs the counts for the last stage of the deep neural network, the memory management logic circuitry may compare the counts to determine the maximum count (element 3235). In other words, the memory management logic circuitry determines from all the counts of concurrently existing shared memory block allocations, the maximum of the shared memory block allocations that exist at the same time during the inference computations throughout entire neural network. This maximum count may be the minimum number of shared memory block allocations required to perform the inference computations.

After determining the maximum count, the memory management logic circuitry may set the sizes of the shared memory block allocations to zero (element 3240) to prepare for a process of determining a minimum size for each of the shared memory block allocations to accommodate all the shared memory requirements of the inference computations through all the stages of the deep neural network. For the first step in that process, the memory management logic circuitry may point to the first stage of the deep neural network again (element 3245) and begin a process of allocating data from the inference computations to the shared memory block allocations.

The process may begin with allocating the input tensor data and the output tensor data to shared memory block allocations and setting the block allocations to the size of the input tensor and the output tensor, respectively (element 3250). Once the memory management logic circuitry assigns shared memory block allocations to the input and output data for a stage, the memory management logic circuitry may step through each inference computation in the stage to determine each additional memory allocation requirement and assign the requirement to one of the shared memory block allocations. If no block allocations are large enough, choose the smallest free shared block allocation and increase the size to accommodate the tensor data (element 3255).

After determining an appropriate size for each of the shared memory block allocations for the first stage, the memory management logic circuitry may determine if there are additional stages (element 3260). If so, the memory management logic circuitry may point the next stage in the deep neural network and repeat the process at element 3250. Otherwise, the process ends.

Figure 4:
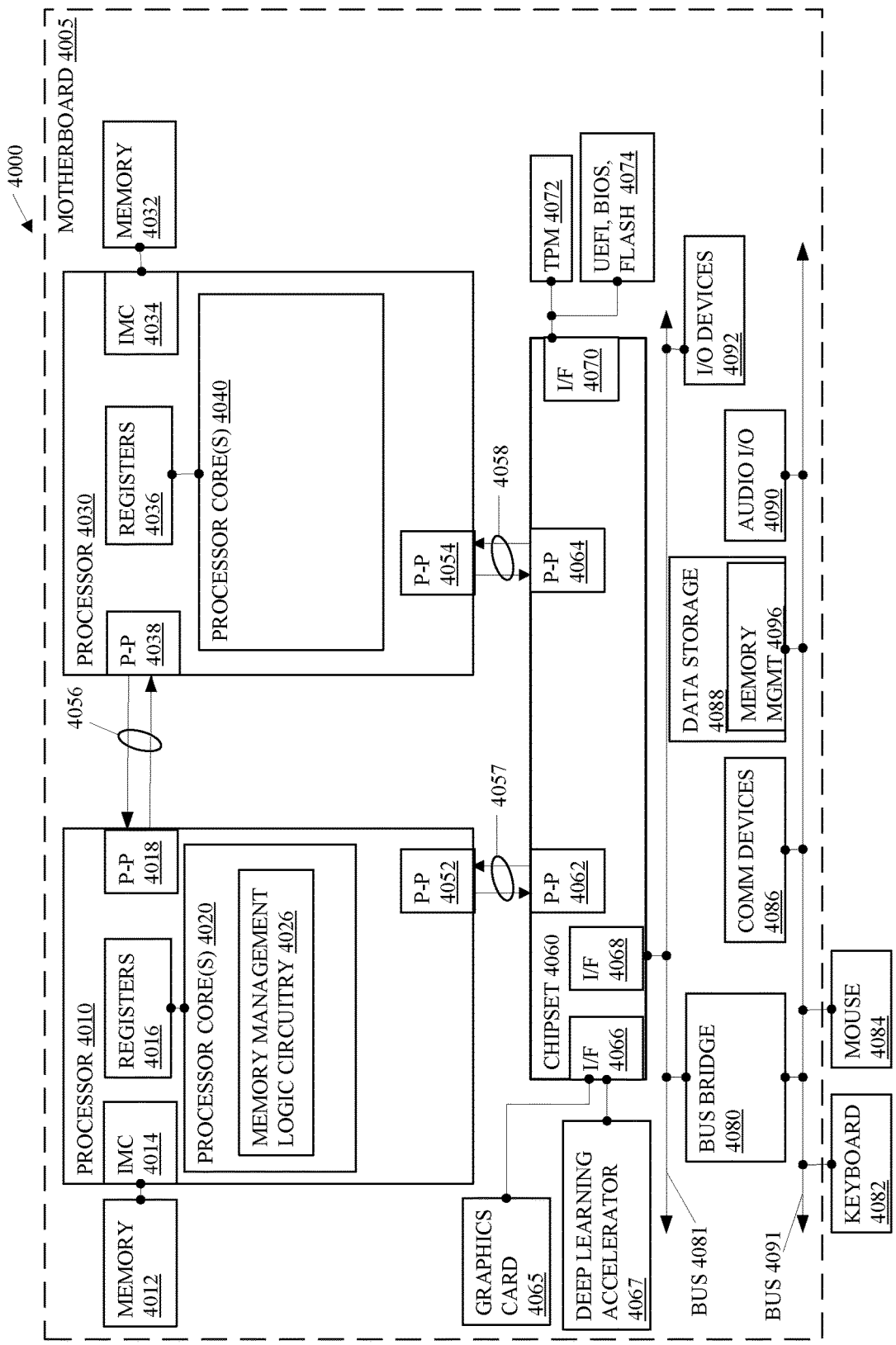
FIG. 4 depicts an embodiment of a system including a multiple-processor platform, a chipset, buses, and accessories.

FIG. 4 illustrates an embodiment of a system 4000. The system 4000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 4000 may have a single processor with one core or more than one processor. Note that the term "processor" refers to a processor with a single core or a processor package with multiple processor cores.

As shown in FIG. 4, system 4000 comprises a motherboard 4005 for mounting platform components. The motherboard 4005 is a point-to-point interconnect platform that includes a first processor 4010 and a second processor 4030 coupled via a point-to-point interconnect 4056 such as an Ultra Path Interconnect (UPI). In other embodiments, the system 4000 may be of another bus architecture, such as a multi-drop bus. Furthermore, each of processors 4010 and 4030 may be processor packages with multiple processor cores including processor core(s) 4020 and 4040, respectively. While the system 4000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 4010 and the chipset 4060. Some platforms may include additional components and some platforms may only include sockets to mount the processors and/or the chipset.

The first processor 4010 includes an integrated memory controller (IMC) 4014 and point-to-point (P-P) interfaces 4018 and 4052. Similarly, the second processor 4030 includes an IMC 4034 and P-P interfaces 4038 and 4054. The IMC's 4014 and 4034 couple the processors 4010 and 4030, respectively, to respective memories, a memory 4012 and a memory 4032. The memories 4012 and 4032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 4012 and 4032 locally attach to the respective processors 4010 and 4030. In other embodiments, the main memory may couple with the processors via a bus and shared memory hub.

The processors 4010 and 4030 comprise caches coupled with each of the processor core(s) 4020 and 4040, respectively. In the present embodiment, the processor core(s) 4020 of the processor 4010 include a memory management logic circuitry 4026 such as the memory management logic circuitry 1022 shown in FIGS. 1A-B. The memory management logic circuitry 4026 may represent circuitry configured to implement the functionality of memory management for neural network support within the processor core(s) 4020 or may represent a combination of the circuitry within a processor and a medium to store all or part of the functionality of the memory management logic circuitry 4026 in memory such as cache, the memory 4012, buffers, registers, and/or the like. In several embodiments, the functionality of the memory management logic circuitry 4026 resides in whole or in part as code in a memory such as the memory management 4096 in the data storage 4088 attached to the processor 4010 via a chipset 4060 such as the memory management logic circuitry 4034 shown in FIGS. 1A-B. The functionality of the memory management logic circuitry 4026 may also reside in whole or in part in memory such as the memory 4012 and/or a cache of the processor. Furthermore, the functionality of the memory management logic circuitry 4026 may also reside in whole or in part as circuitry within the processor 4010 and may perform operations, e.g., within registers or buffers such as the registers 4016 within the processor 4010, or within an instruction pipeline of the processor 4010.

In other embodiments, more than one of the processors 4010 and 4030 may comprise functionality of the memory management logic circuitry 4026 such as the processor 4030 and/or the processor within the deep learning accelerator 4067 coupled with the chipset 4060 via an interface (I/F) 4066. The I/F 4066 may be, for example, a Peripheral Component Interconnect-enhanced (PCI-e).

The first processor 4010 couples to a chipset 4060 via P-P interconnects 4052 and 4062 and the second processor 4030 couples to a chipset 4060 via P-P interconnects 4054 and 4064. Direct Media Interfaces (DMIs) 4057 and 4058 may couple the P-P interconnects 4052 and 4062 and the P-P interconnects 4054 and 4064, respectively. The DMI may be a high-speed interconnect that facilitates, e.g., eight Giga Transfers per second (GT/s) such as DMI 3.0. In other embodiments, the processors 4010 and 4030 may interconnect via a bus.

The chipset 4060 may comprise a controller hub such as a platform controller hub (PCH). The chipset 4060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 4060 may comprise more than one controller hub such as a chipset with a memory controller hub, a graphics controller hub, and an input/output (I/O) controller hub.

In the present embodiment, the chipset 4060 couples with a trusted platform module (TPM) 4072 and the UEFI, BIOS, Flash component 4074 via an interface (I/F) 4070. The TPM 4072 is a dedicated microcontroller designed to secure hardware by integrating cryptographic keys into devices. The UEFI, BIOS, Flash component 4074 may provide pre-boot code.

Furthermore, chipset 4060 includes an I/F 4066 to couple chipset 4060 with a high-performance graphics engine, graphics card 4065. In other embodiments, the system 4000 may include a flexible display interface (FDI) between the processors 4010 and 4030 and the chipset 4060. The FDI interconnects a graphics processor core in a processor with the chipset 4060.

Various I/O devices 4092 couple to the bus 4081, along with a bus bridge 4080 which couples the bus 4081 to a second bus 4091 and an I/F 4068 that connects the bus 4081 with the chipset 4060. In one embodiment, the second bus 4091 may be a low pin count (LPC) bus. Various devices may couple to the second bus 4091 including, for example, a keyboard 4082, a mouse 4084, communication devices 4086 and a data storage unit 4088 that may store code such as the compiler 4096. Furthermore, an audio I/O 4090 may couple to second bus 4091. Many of the I/O devices 4092, communication devices 4086, and the data storage unit 4088 may reside on the motherboard 4005 while the keyboard 4082 and the mouse 4084 may be add-on peripherals. In other embodiments, some or all the I/O devices 4092, communication devices 4086, and the data storage unit 4088 are add-on peripherals and do not reside on the motherboard 4005.

Figure 5:
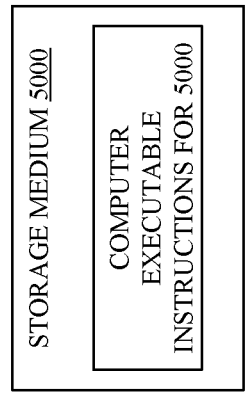
FIGS. 5-6 depict embodiments of a storage medium and a computing platform.

FIG. 5 illustrates an example of a storage medium 5000 to store processor data structures. Storage medium 5000 may comprise an article of manufacture. In some examples, storage medium 5000 may include any non-transitory computer readable medium or machine readable medium, such as an optical, magnetic or semiconductor storage. Storage medium 5000 may store various types of computer executable instructions, such as instructions to implement logic flows and/or techniques described herein. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
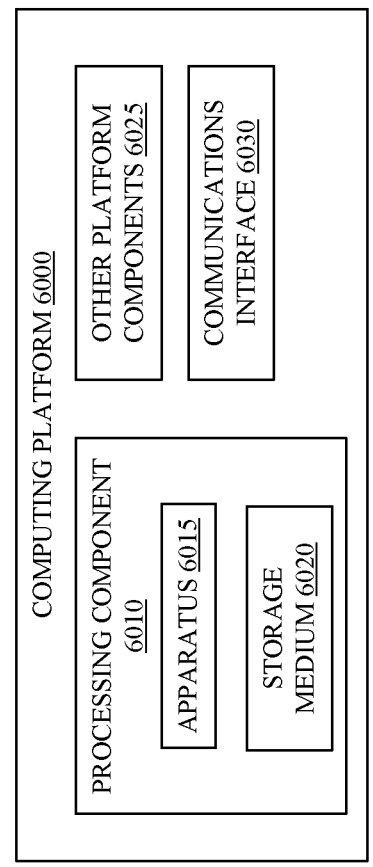

FIG. 6 illustrates an example computing platform 6000. In some examples, as shown in FIG. 6, computing platform 6000 may include a processing component 6010, other platform components or a communications interface 6030. According to some examples, computing platform 6000 may be implemented in a computing device such as a server in a system such as a data center or server farm that supports a manager or controller for managing configurable computing resources as mentioned above. Furthermore, the communications interface 6030 may comprise a wake-up radio (WUR) and may be capable of waking up a main radio of the computing platform 6000.

According to some examples, processing component 6010 may execute processing operations or logic for apparatus 6015 described herein such as the memory management logic circuitry 1034 illustrated in FIGS. 1A and 1B. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 6000 described herein, may be included or omitted in various embodiments of computing platform 6000, as suitably desired.

The components and features of computing platform 6000 may be implemented using any combination of discrete circuitry, ASICs, logic gates and/or single chip architectures. Further, the features of computing platform 6000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the exemplary computing platform 6000 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

Several embodiments have one or more potentially advantages effects. For instance, optimize memory usage advantageously reducing memory resource requirements such as cache requirements in embedded systems and reducing memory usage while executing several processes at the same time such as multi-processor systems. Minimizing shareable block allocations advantageously reducing memory resource requirements such as cache requirements in embedded systems and reducing memory usage while executing several processes at the same time such as multi-processor systems. Analyzing the temporal sequence of memory use in inference computations in DNN processing advantageously facilitating batch or parallel processing. Automatically processing stages of a neural network in batch for inference computations without increasing the total memory size advantageously reducing memory resource requirements such as cache requirements in embedded systems and reducing memory usage while executing several processes at the same time such as multi-processor systems. Reducing the size of runtime memory for DNN inference computations advantageously reducing memory resource requirements such as cache requirements in embedded systems and reducing memory usage while executing several processes at the same time such as multi-processor systems. Performing batch processing advantageously increasing performance in terms of the speed of inference computations for a pre-trained neural network.

EXAMPLES OF FURTHER EMBODIMENTS

The following examples pertain to further embodiments. Specifics in the examples may be used anywhere in one or more embodiments.

Example 1 is an apparatus to manage memory resources, the apparatus comprising: memory; and logic circuitry coupled with the memory to determine, for two or more stages of a cascaded neural network, a count of shared memory block allocations that concurrently exist during execution of the two or more stages; and determine a size for each of the shared memory block allocations of the count of shared memory block allocations, to accommodate data to store in a shared memory during execution of the two or more stages of the cascaded neural network for inference computations. In Example 2, the apparatus of claim 1, wherein the logic circuitry is configured to generate a list of the shared memory block allocations that concurrently exist during execution of the two or more stages and size information for each of the shared memory block allocations. In Example 3, the apparatus of claim 1, wherein the logic circuitry is configured to determine a batch size per stage of the two or more stages of a cascaded neural network. In Example 4, the apparatus of claim 1, wherein the logic circuitry is configured to determine a count of inputs for a stage of the two or more stages that lack interdependencies. In Example 5, the apparatus of claim 4, wherein the logic circuitry is configured to determine the batch size based on a fixed amount of shared memory available for execution of the two or more stages of the cascaded neural network. In Example 6, the apparatus of claim 5, wherein the logic circuitry is configured to determine the batch size based on the fixed amount of shared memory available for execution of the two or more stages of the cascaded neural network based on the maximum count, the size determined for each shared memory block allocations, and the count of inputs. In Example 7, the apparatus of claim 1, wherein the logic circuitry is configured to determine a count of shared memory block allocations for tensor data to store in the shared memory and size information for the tensor data. In Example 8, the apparatus of claim 1, wherein the logic circuitry is configured to compare counts of the shared memory block allocations that concurrently exist during execution of each of the two or more stages of the cascaded neural network to determine a maximum count of the counts of the shared memory block allocations. In Example 9, the apparatus of claim 1, wherein the logic circuitry is configured to calculate a batch size based on a ratio of an input data size of a first stage of the two or more stages to an input data size of another stage of the two or more stages.

Example 10 is a method to manage memory resources, the method comprising: determining, by a memory management logic circuitry, for two or more stages of a cascaded neural network, a count of shared memory block allocations that concurrently exist during execution of the two or more stages; and determining, by the memory management logic circuitry, a size for each of the shared memory block allocations of the count of shared memory block allocations, to accommodate data to store in a shared memory during execution of the two or more stages of the cascaded neural network for inference computations. In Example 11, the method of claim 10, further comprising generating, by the memory management logic circuitry, a list of the shared memory block allocations that concurrently exist during execution of the two or more stages and size information for each of the shared memory block allocations. In Example 12, the method of claim 10, further comprising determining a batch size per stage of the two or more stages of a cascaded neural network. In Example 13, the method of claim 10, wherein determining a batch size per stage comprises determining a count of inputs for a stage of the two or more stages that lack interdependencies. In Example 14, the method of claim 13, wherein determining a batch size per stage comprises determining the batch size based on a fixed amount of shared memory available for execution of the two or more stages of the cascaded neural network. In Example 15, the method of claim 14, wherein determining the batch size based on a fixed amount of shared memory available for execution of the two or more stages of the cascaded neural network based on the maximum count, comprises determining the batch size based on the maximum count, the size determined for each shared memory block allocations, and the count of inputs. In Example 16, the method of claim 10, wherein determining a count of the shared memory block allocations comprises determining the count of shared memory block allocations for tensor data to store in the shared memory and size information for the tensor data. In Example 17, the method of claim 10, wherein determining a size for each of the shared memory block allocations comprises comparing counts of the shared memory block allocations that concurrently exist during execution of each of the two or more stages of the cascaded neural network to determine a maximum count of the counts of the shared memory block allocations. In Example 18, the method of claim 10, wherein the logic circuitry is configured to calculate a batch size based on a ratio of an input data size of a first stage of the two or more stages to an input data size of another stage of the two or more stages.

Example 19 is a computer readable medium having stored thereon instructions that when executed cause a computer to perform operations comprising the operations of any one of claims 8-14. Example 20 an apparatus to manage memory resources, the apparatus comprising a means for performing any one of claims 10-18. Example 21 a program for causing a computer to perform operations comprising operations of any one of claims 10-18. Example 22 a computer-readable storage medium for storing the program of claim 21.

Example 23 a system to manage memory resources, the system comprising: memory comprising dynamic DRAM; logic circuitry coupled with the memory to determine, for two or more stages of a cascaded neural network, a count of shared memory block allocations that concurrently exist during execution of the two or more stages; and determine a size for each of the shared memory block allocations of the count of shared memory block allocations, to accommodate data to store in a shared memory during execution of the two or more stages of the cascaded neural network for inference computations. In Example 24, the system of claim 23, wherein the logic circuitry is configured to generate a list of the shared memory block allocations that concurrently exist during execution of the two or more stages and size information for each of the shared memory block allocations. In Example 25, the system of claim 23, wherein the logic circuitry is configured to determine a batch size per stage of the two or more stages of a cascaded neural network. In Example 26, the system of claim 23, wherein the logic circuitry is configured to determine a count of inputs for a stage of the two or more stages that lack interdependencies and determining the batch size based on a fixed amount of shared memory available for execution of the two or more stages of the cascaded neural network. In Example 27, the system of claim 26, wherein the logic circuitry is configured to determine a count of inputs for a stage of the two or more stages that lack interdependencies and determining the batch size based on a fixed amount of shared memory available for execution of the two or more stages of the cascaded neural network. In Example 28, the system of claim 27, wherein the logic circuitry is configured to determine the batch size based on the fixed amount of shared memory available for execution of the two or more stages of the cascaded neural network based on the maximum count, the size determined for each shared memory block allocations, and the count of inputs. In Example 29, the system of claim 23, wherein the logic circuitry is configured to determine a count of shared memory block allocations for tensor data to store in the shared memory and size information for the tensor data. In Example 30, the system of claim 23, wherein the logic circuitry is configured to compare counts of the shared memory block allocations that concurrently exist during execution of each of the two or more stages of the cascaded neural network to determine a maximum count of the counts of the shared memory block allocations. In Example 31, the system of claim 23, wherein the logic circuitry is configured to calculate a batch size based on a ratio of an input data size of a first stage of the two or more stages to an input data size of another stage of the two or more stages.

Example 32 is a non-transitory machine-readable medium containing instructions, which when executed by a processor, cause the processor to perform operations, the operations comprising: determining, by a memory management logic circuitry, for two or more stages of a cascaded neural network, a count of shared memory block allocations that concurrently exist during execution of the two or more stages; and determining, by the memory management logic circuitry, a size for each of the shared memory block allocations of the count of shared memory block allocations, to accommodate data to store in a shared memory during execution of the two or more stages of the cascaded neural network for inference computations. In Example 33, the machine-readable medium of claim 32, wherein the operations further comprise generating, by the memory management logic circuitry, a list of the shared memory block allocations that concurrently exist during execution of the two or more stages and size information for each of the shared memory block allocations. In Example 34, the machine-readable medium of claim 32, wherein the operations further comprise determining a batch size per stage of the two or more stages of a cascaded neural network. In Example 35, the machine-readable medium of claim 32, wherein determining a batch size per stage comprises determining a count of inputs for a stage of the two or more stages that lack interdependencies. In Example 36, the machine-readable medium of claim 35, wherein determining the batch size based on a fixed amount of shared memory available for execution of the two or more stages of the cascaded neural network. In Example 37, the machine-readable medium of claim 36, wherein determining the batch size based on a fixed amount of shared memory available for execution of the two or more stages of the cascaded neural network based on the maximum count, comprises determining the batch size based on the maximum count, the size determined for each shared memory block allocations, and the count of inputs. In Example 38, the machine-readable medium of claim 32, wherein determining a count of the shared memory block allocations comprises determining the count of shared memory block allocations for tensor data to store in the shared memory and size information for the tensor data. In Example 39, the machine-readable medium of claim 32, wherein determining a size for each of the shared memory block allocations comprises comparing counts of the shared memory block allocations that concurrently exist during execution of each of the two or more stages of the cascaded neural network to determine a maximum count of the counts of the shared memory block allocations. In Example 40, the machine-readable medium of claim 32, wherein the logic circuitry is configured to calculate a batch size based on a ratio of an input data size of a first stage of the two or more stages to an input data size of another stage of the two or more stages.

Example 41 is an apparatus to manage memory resources, the apparatus comprising: a means for determining, by a memory management logic circuitry, for two or more stages of a cascaded neural network, a count of shared memory block allocations that concurrently exist during execution of the two or more stages; and a means for determining, by the memory management logic circuitry, a size for each of the shared memory block allocations of the count of shared memory block allocations, to accommodate data to store in a shared memory during execution of the two or more stages of the cascaded neural network for inference computations. In Example 42, the apparatus of claim 41, further comprising generating, by the memory management logic circuitry, a list of the shared memory block allocations that concurrently exist during execution of the two or more stages and size information for each of the shared memory block allocations. In Example 43, the apparatus of claim 41, further comprising determining a batch size per stage of the two or more stages of a cascaded neural network. In Example 44, the apparatus of claim 41, wherein determining a batch size per stage comprises determining a count of inputs for a stage of the two or more stages that lack interdependencies. In Example 45, the apparatus of claim 44, wherein determining the batch size based on a fixed amount of shared memory available for execution of the two or more stages of the cascaded neural network. In Example 46, the apparatus of claim 45, wherein determining the batch size based on a fixed amount of shared memory available for execution of the two or more stages of the cascaded neural network based on the maximum count, comprises determining the batch size based on the maximum count, the size determined for each shared memory block allocations, and the count of inputs. In Example 47, the apparatus of claim 41, wherein determining a count of the shared memory block allocations comprises determining the count of shared memory block allocations for tensor data to store in the shared memory and size information for the tensor data. In Example 48, the apparatus of claim 41, wherein determining a size for each of the shared memory block allocations comprises comparing counts of the shared memory block allocations that concurrently exist during execution of each of the two or more stages of the cascaded neural network to determine a maximum count of the counts of the shared memory block allocations. In Example 49, the apparatus of claim 41, wherein the logic circuitry is configured to calculate a batch size based on a ratio of an input data size of a first stage of the two or more stages to an input data size of another stage of the two or more stages.

What is claimed is:

1. An apparatus, comprising:
   memory;
   accelerator circuitry arranged to execute a cascade neural network (CNN) using the memory to store data to compute an inference with the CNN; and
   memory management logic circuitry coupled with the memory, the memory management logic circuitry to:
     determine, for two or more stages of the CNN, a count of concurrent shared memory block allocations, the concurrent shared memory block allocations to comprise memory block allocations that concurrently exist across two or more layers of at least one of the two or more stages of the CNN;
     determine a size for each of the shared memory block allocations of the count of concurrent shared memory block allocations; and
     allocate portions of the memory, based on the count of concurrent shared memory block allocation and the size for each of the shared memory block allocations, to accommodate the data in the memory during execution of the CNN.

2. The apparatus of claim 1, wherein the logic circuitry is configured to generate a list of the concurrent, shared memory block allocations and size information for each of the shared memory block allocations.

3. The apparatus of claim 1, wherein the logic circuitry is configured to determine a batch size per stage of the two or more stages of the cascaded neural network.

4. The apparatus of claim 1, wherein the logic circuitry is configured to determine a count of inputs for a stage of the two or more stages that lack interdependencies.

5. The apparatus of claim 4, wherein the logic circuitry is configured to determine a batch size based on a fixed amount of shared memory available for execution of the two or more stages of the cascaded neural network.

6. The apparatus of claim 5, wherein the logic circuitry is configured to determine the batch size based on the fixed amount of shared memory available for execution of the two or more stages of the cascaded neural network based on a maximum count, the size determined for each shared memory block allocations, and the count of inputs.

7. The apparatus of claim 1, wherein the logic circuitry is configured to determine a count of shared memory block allocations for tensor data to store in the shared memory and size information for the tensor data.

8. The apparatus of claim 1, wherein the logic circuitry is configured to compare counts of the concurrent, shared memory block allocations of the cascaded neural network to determine a maximum count of the counts of the shared memory block allocations.

9. The apparatus of claim 1, wherein the logic circuitry is configured to calculate a batch size based on a ratio of an input data size of a first stage of the two or more stages to an input data size of another stage of the two or more stages.

10. A computing implemented method, comprising:
   determining, by a memory management logic circuitry coupled to memory, for two or more stages of a cascaded neural network (CNN), a count of concurrent shared memory block allocations, the concurrent shared memory block allocations to comprise memory block allocations that concurrently exist across two or more layers of at least one of the two or more stages of the CNN;
   determining, by the memory management logic circuitry, a size for each of the shared memory block allocations of the count of concurrent shared memory block allocations; and
   allocating, by the memory management logic circuitry, portions of the memory, based on the count of concurrent shared memory block allocation and the size for each of the shared memory block allocations, to accommodate the data in the memory during execution of the CNN by accelerator circuitry to compute an inference.

11. The method of claim 10, further comprising generating, by the memory management logic circuitry, a list of the concurrent, shared memory block allocations and size information for each of the concurrent, shared memory block allocations.

12. The method of claim 10, further comprising determining a batch size per stage of the two or more stages of the cascaded neural network.

13. The method of claim 10, wherein determining a batch size per stage comprises determining a count of inputs for a stage of the two or more stages that lack interdependencies.

14. The method of claim 13, wherein determining a batch size per stage comprises determining the batch size based on a fixed amount of shared memory available for execution of the two or more stages of the cascaded neural network.

15. The method of claim 14, wherein determining the batch size based on a fixed amount of shared memory available for execution of the two or more stages of the cascaded neural network based on a maximum count, comprises determining the batch size based on the maximum count, the size determined for each shared memory block allocations, and the count of inputs.

16. The method of claim 10, wherein determining a count of the concurrent, shared memory block allocations comprises determining the count of shared memory block allocations for tensor data to store in the shared memory and size information for the tensor data.

17. The method of claim 10, wherein determining a size for each of the shared memory block allocations comprises comparing counts of the concurrent, shared memory block allocations of the cascaded neural network to determine a maximum count of the counts of the concurrent, shared memory block allocations.

18. The method of claim 10, wherein the logic circuitry is configured to calculate a batch size based on a ratio of an input data size of a first stage of the two or more stages to an input data size of another stage of the two or more stages.

19. A system to manage memory resources, the system comprising:
   a communications interface coupled to memory; and
   a processing component to determine a count and a size of concurrent shared memory block allocations in multiple stages of a cascaded neural network, the concurrent shared memory block allocations to comprise memory block allocations that concurrently exist across two or more layers of at least one of the two or more stages of the CNN, and to allocate at least a portion of the memory, based on the count of concurrent shared memory block allocation and the size for each of the shared memory block allocations, to accommodate data in the memory for execution of a cascaded neural network for performance of inference computations;
   wherein the memory comprises dynamic random-access memory.

20. The system of claim 19, wherein the processing component is configured to generate a list of the concurrent, shared memory block allocations and size information for each of the shared memory block allocations.

21. The system of claim 19, wherein the processing component is configured to determine a batch size per stage of the multiple stages of the cascaded neural network.

22. A non-transitory machine-readable medium containing instructions, which when executed by a processor coupled to memory, cause the processor to perform operations, the operations comprising:
   determining, by a memory management logic circuitry, for two or more stages of a cascaded neural network, a count of concurrent shared memory block allocations, the concurrent shared memory block allocations to comprise memory block allocations that concurrently exist across two or more layers of at least one of the two or more stages of the cascaded neural network;
   determining, by the memory management logic circuitry, a size for each of the shared memory block allocations of the count of concurrent shared memory block allocations; and
   allocating a portion of the memory, based on the count of concurrent shared memory block allocation and the size for each of the shared memory block allocations, to accommodate data in the memory for execution of a cascaded neural network for inference computations.

23. The machine-readable medium of claim 22, wherein the operations further comprise generating, by the memory management logic circuitry, a list of the concurrent, shared memory block allocations and size information for each of the shared memory block allocations.

24. The machine-readable medium of claim 22, wherein the operations further comprise determining a batch size per stage of the two or more stages of the cascaded neural network.

25. The machine-readable medium of claim 22, wherein determining a batch size per stage comprises determining a count of inputs for a stage of the two or more stages that lack interdependencies.

* * * * *